United States Patent
Andre et al.

[11] Patent Number: 6,158,392
[45] Date of Patent: Dec. 12, 2000

[54] DEVICE FOR PROHIBITING THE CROSSING OF A ZONE BOUNDARY BY AN ANIMAL

[75] Inventors: Max Andre; Xavier Aubry, both of Chamalières, France

[73] Assignee: Dynavet S.A.R.L., Clermond-Ferrand, France

[21] Appl. No.: 09/254,406

[22] PCT Filed: Sep. 3, 1997

[86] PCT No.: PCT/FR97/01550

§ 371 Date: Mar. 3, 1999

§ 102(e) Date: Mar. 3, 1999

[87] PCT Pub. No.: WO98/09508

PCT Pub. Date: Mar. 12, 1998

[30] Foreign Application Priority Data

Sep. 3, 1996 [FR] France ................................ 96 10870

[51] Int. Cl.[7] ........................................... A01K 29/00
[52] U.S. Cl. ........................................... 119/721
[58] Field of Search ................... 119/905, 908, 119/903, 719, 720, 721; 340/573

[56] References Cited

U.S. PATENT DOCUMENTS

| | | |
|---|---|---|
| 3,980,051 | 9/1976 | Fury . |
| 4,627,385 | 12/1986 | Vinci ........................... 119/721 |
| 5,009,192 | 4/1991 | Burman ....................... 119/721 |
| 5,046,453 | 9/1991 | Vinci . |
| 5,603,287 | 2/1997 | Houck ......................... 119/721 |
| 5,852,403 | 12/1998 | Boardman ................... 119/721 |
| 5,868,103 | 2/1999 | Boyd ........................... 119/719 |

FOREIGN PATENT DOCUMENTS

| | | |
|---|---|---|
| 2220814 | 1/1990 | United Kingdom . |
| 9505071 | 2/1995 | WIPO . |
| 9604628 | 2/1996 | WIPO . |

*Primary Examiner*—Thomas Price
*Attorney, Agent, or Firm*—Horst M. Kasper

[57] ABSTRACT

The invention concerns a device for prohibiting the crossing of a zone boundary by an animal (2,4). This device comprises interactive means (12, 14) for locating the animal (2, 4) with respect to a control station (8), means for sanctioning (16) the use of which is dependent on means (66, 50, 52, 54) for processing and analyzing data supplied by said locating means (12, 140. The sanctioning means (16) are means for fogging a fluid, comprising an electrovalve; the actuating of the electrovalve varies in frequency, in duration and in delivery according to the distance separating the animal from the control station and the duration of the presence of the animal in the zone to be protected.

11 Claims, 7 Drawing Sheets

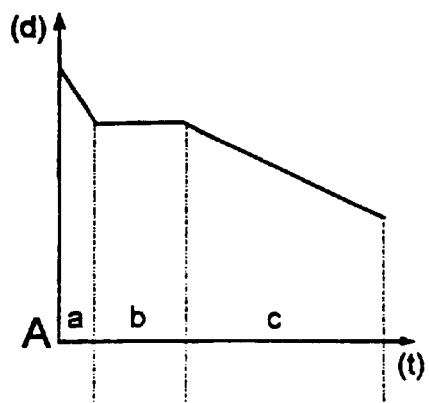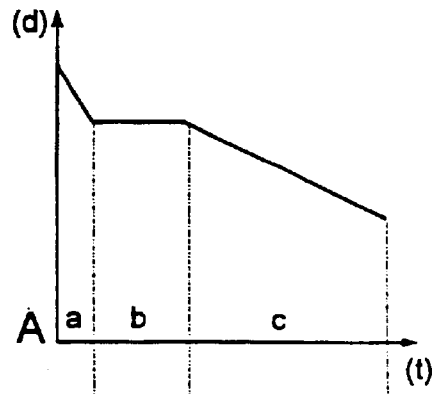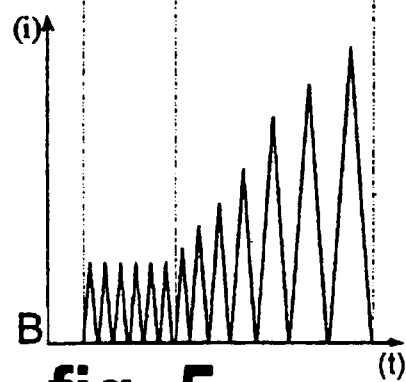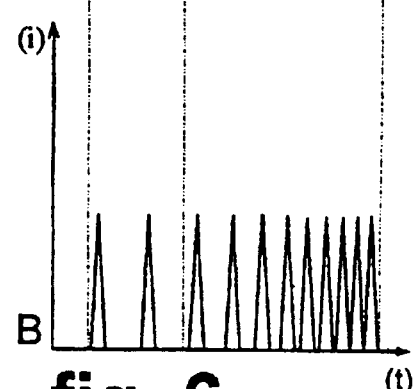
fig. 5 fig. 6
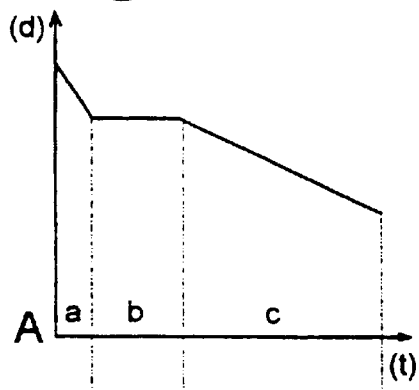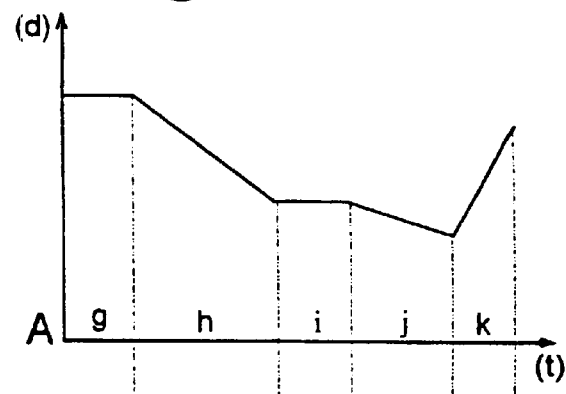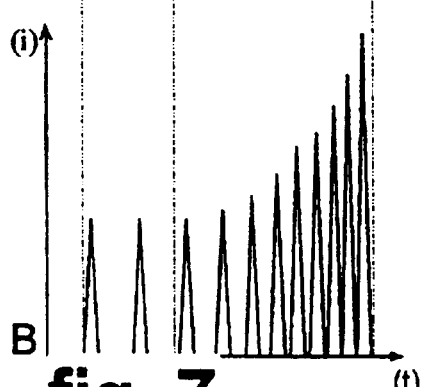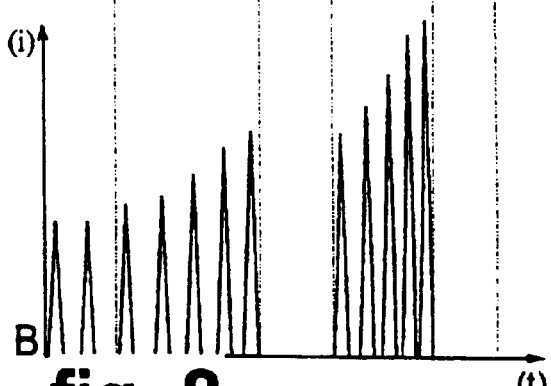
fig. 7 fig. 8

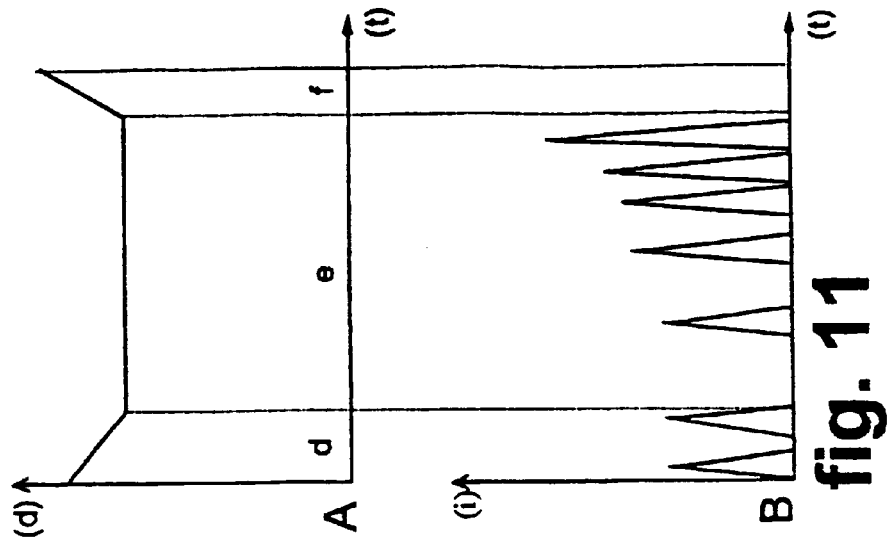
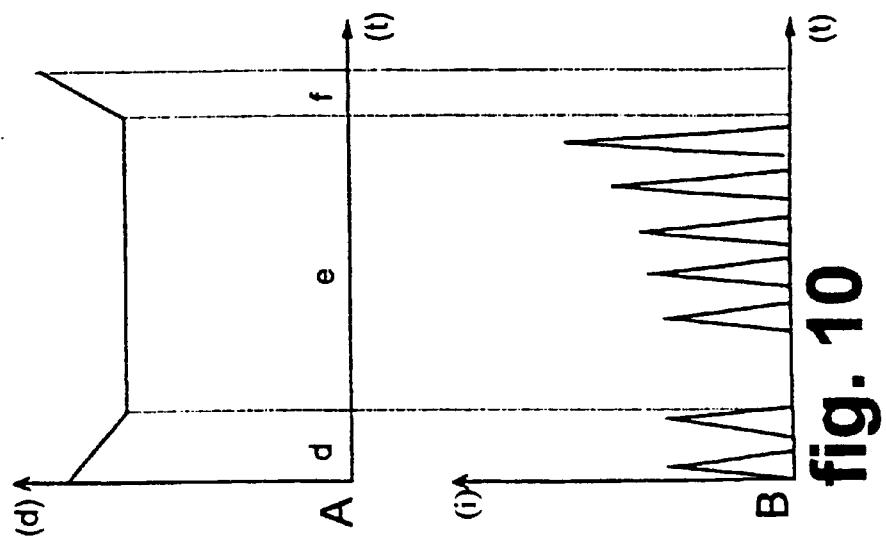
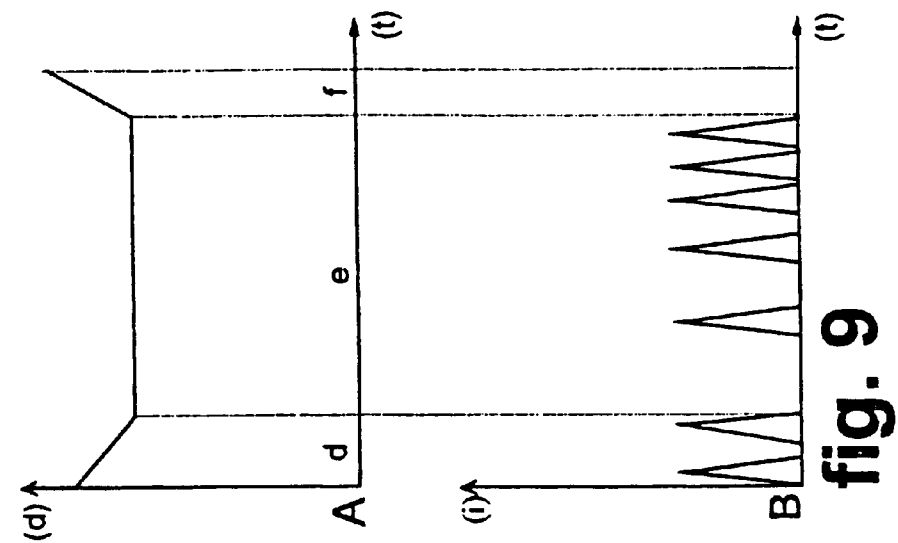

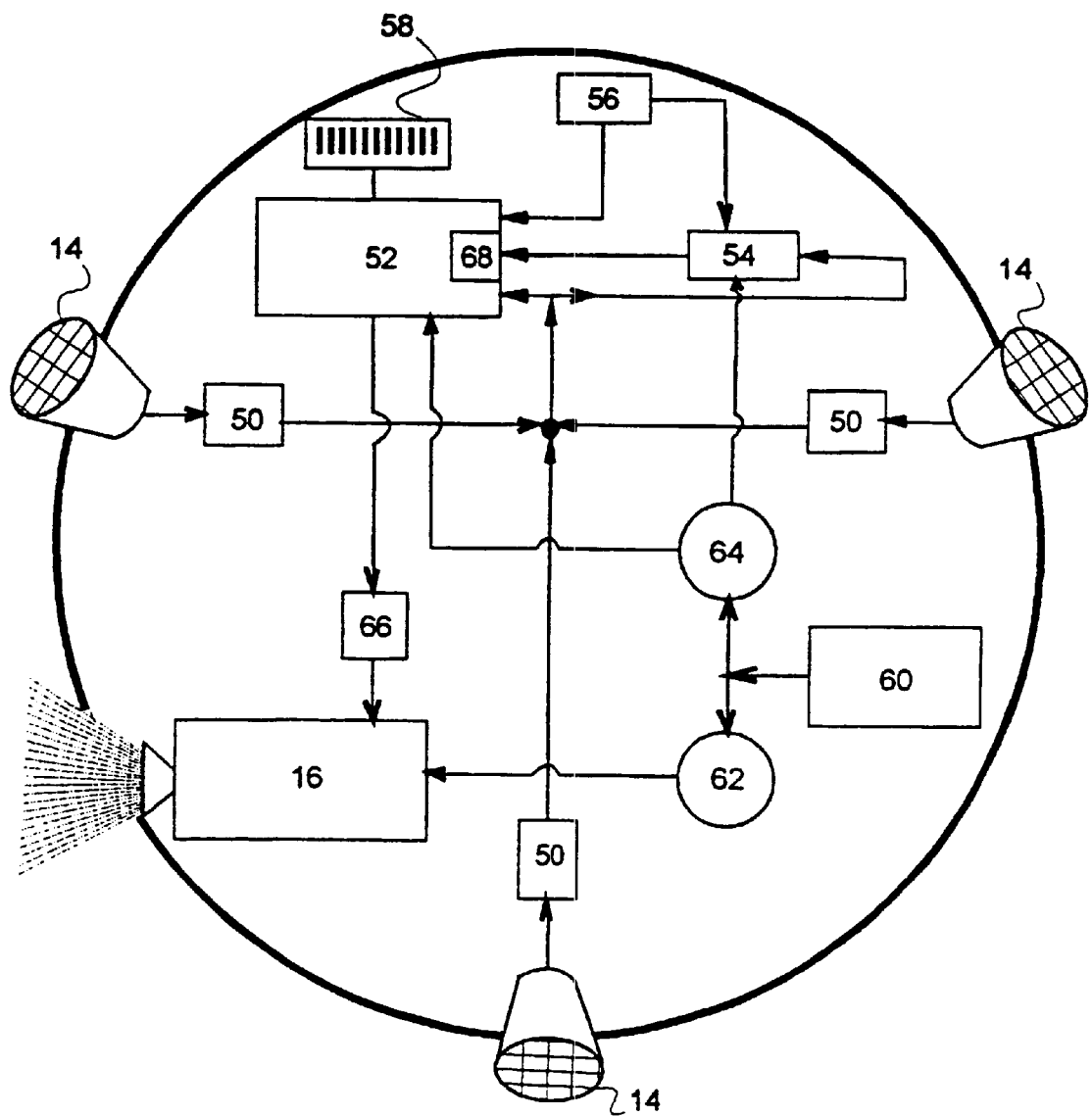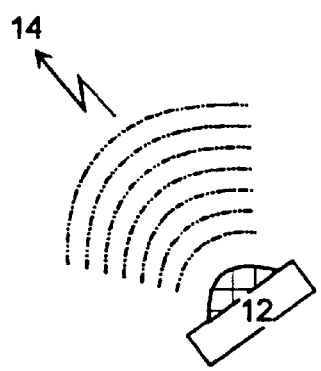
fig.15

DEVICE FOR PROHIBITING THE CROSSING OF A ZONE BOUNDARY BY AN ANIMAL

BACKGROUND OF THE INVENTION

1. Field of the Invention

The invention is in the field of means for training the behavior of animals, and more particularly domestic animals, and its subject is a device for prohibiting the crossing of a zone boundary between an animal and a control station.

Various devices are known for prohibiting an animal from approaching or moving away from a zone. In their generality, these devices comprise means for detecting the position of the animal with respect to at least one control station, and sanctioning means which are implemented when the animal is in a situation of misconduct, that is to say when it is too close to or too far away from the control station.

In general, the problem to be solved for these devices lies in the compromise to be found between effectiveness, reliability by taking into account a possible acclimatization of the animal to the sanction, ergonomics enabling the user to exploit the device with ease, and the lowest possible purchase price and exploitation cost so as to make the device competitive. Thus, in general, the efforts of designers in the field and the respective inventive approaches which have stemmed therefrom pertain to devices implementing modes of operation and means appertaining thereto which seem to them to be the best answer to this compromise.

2. Brief Description of the Background of the Invention Including Prior Art

Certain Prior Art designers have proposed simple devices: for example, the U.S. Pat. No. 3980051 (FURY) describes a device contrived to be carried by the user and intended for keeping the animal near to him/her. The means for detecting the position of the animal are of the type employing transmission/reception of ultrasound signals, a transmitter being supported by the collar of the animal and a receiver being supported by a control station carried by the user. When the animal moves too far away from the user and the ultrasound signal is no longer perceived by the control station, an audible signal which can be heard by the animal is transmitted from the control station so as to call it back. Again as an example, the U.S. Pat. No 5501179 (CORY) proposes a device comprising means for detecting the approach of the animal, by detecting heat for example, so as to actuate a pump which sprays water. Concerning this latter sanctioning regime by spraying fluid, it will be noted that the patent FR2560003 (VINCI) discloses a sanctioning regime by spraying fluid, implementing an electric valve operated by means for detecting the barking of a dog.

The modes of implementing the sanctioning means determine the effectiveness and reliability of the device, and certain Prior Art designers have brought their choice to bear on sanctioning means of the electric shock type, with a prior warning to the animal, audible in particular or low-intensity electric shock. Several zone boundaries correspond respectively to the implementation of the warning and to the application of the sanction. For example, reference may be made to the patents GB 2220814 (TORRINGTON PRODUCTS VENTURE), WO9402004 (POLE ZERO CORP.), WO9630882 (RADIO SYSTEM CORPORATION), WO9528691 (RADIO SYSTEM CORPORATION), WO9604628 (YARNALL) and WO9505071 (INVISIBLE FENCE COMPANY).

The means for detecting the position of the animal must therefore take this plurality of zone boundaries into account. Certain devices, such as those described in WO9630882 (RADIO SYSTEM CORPORATION), WO9528691 (RADIO SYSTEM CORPORATION), or WO9505071 (INVISIBLE FENCE COMPANY [sic]), use means for generating a magnetic field, by means of an inductive loop in particular, which circumscribes the zone and thereby constitutes the control station. Other devices, such as those described by GB 2220814 (TORRINGTON PRODUCTS VENTURE), WO 9604628 (YARNALL) or WO9402004 (POLE ZERO CORP.) use radiofrequency signals. In general, a first signal is transmitted to a sensor module which may equally well be carried on the animal or supported by the control station. This first signal is compared with a first reference signal so as to detect a crossing by the animal of a first zone boundary. If affirmative, a return signal is transmitted so as to implement the warning; the sanction is then applied in the case where, despite the warning given, the animal remains inside the first zone for a predetermined duration, or in the case where the animal crosses a second zone boundary, in which case the application of the sanction is operated by a second return signal after comparing the first signal with a second reference signal.

It appears that the choice of the sanctioning means firstly, and subsequently the choice of the modes of implementation thereof by appropriate means adapted to the nature of the sanctioning means chosen, determine the effectiveness of the device. The problem posed by the Prior Art devices lies in the fact that the various inventive approaches of the designers have led them to bring their choice to bear on sanctioning means and their modes of implementation which make it possible for the animal to become acclimatized to the sanction, resulting therefore in a loss of effectiveness of the devices over time.

SUMMARY OF THE INVENTION

1. Purposes of the Invention

Thus, the purpose of the present invention is to propose a device for prohibiting the crossing of a zone boundary between at least one animal and at least one control station, which is competitive, effective and reliable over time against a possible acclimatization of the animal.

The first premise of the inventive approach of the present invention is to propose a device for prohibiting the crossing of a zone boundary in respect of an animal, whose sanctioning means are such that the modes of operation of the device can take into account the alteration in the situation of misconduct of the animal, in particular by measuring the distance separating the animal from the control station and by measuring the time of presence of the animal in the zone, so as to apply a sanction and vary it in proportion to the alteration in the situation of misconduct, and hence in proportion to the posture of the animal. The choice of the sanctioning means must therefore take into account the possibility of maintaining the sanction and of altering it continuously as long as the animal persists in overstepping the prohibition.

A second premise of the inventive approach of the present invention is to enable the user to modify the modes of operation of the device, as a function of the reactions customarily made by the animal and as a function of its acclimatization to the operation of the device. The choice of the sanctioning means must therefore take into account their ability to adapt to a modification of their modes of implementation, without unduly disturbing or harming the animal.

2. Brief Description of the Invention

Thus, a first aspect of the invention lies in the fact that the sanctioning means are of the fluid spraying type, customarily neglected by the Prior Art designers, said sanctioning means implementing an electric valve, by virtue of which and of simple means for activating the electric valve which make the device competitive, the sanction can be maintained as long as the animal is in a situation of misconduct, can be adapted by the user in accordance with the postures and customary reactions of the animal to the device, and can alter in proportion to the posture of the animal after applying the sanction.

Thus and according to another aspect of the invention, the device comprises means for operating the activation of the electric valve placed under the dependence of any one at least, firstly of means for detecting the position of the animal with respect to the control station, comprising means for measuring the distance separating them, and secondly of chronometric means measuring the time of presence or non-presence of the animal in the zone, so that the sanction may be varied in proportion to the variation in said distance and/or in proportion to the time of presence of the animal in the zone, or outside the latter in accordance with the reason for the prohibition.

Continuing his inventive approach, the Applicant proposes to enable the user, by virtue of means for selecting and adjusting implementation thresholds, to vary the modes of application of the sanction, both those for activating the electric valve through a variation in the duration of each of the fluid sprayings, and/or through a variation in the frequency of these sprayings, and/or through a variation in the delivery of the electric valve for a given duration of activation, and those relating to criteria evaluating the misconduct of the animal, in accordance with the latter's time of presence or non-presence in the zone and/or in accordance with the variation in the distance separating it from the control station.

It will be understood that according to the inventive approaches envisioned above, the means for detecting the position of the animal and the chronometric means are measuring means which supply information which continuously reflects the posture of the animal and which can be exploited so as to vary the activation of the electric valve in proportion to these measurements.

Additionally, the means for detecting the position of the animal are, for example, means of the ultra-sound type, of the radiofrequency type or else of the inductive loop type, comprising a transmitter module and a receiver module which can equally well be carried on the animal or supported by the control station. However, the means of the ultrasound type are preferred by exploiting the amplitude of the ultrasound signal received which is measured so as to determine the gap between the animal and the control station.

Thus the device of the invention for prohibiting the crossing of a zone boundary by an animal, is a device of the kind comprising:

a low-voltage electrical energy source, means for detecting the position of the animal with respect to the zone boundary, comprising interactive means respectively carried by the animal and supported by a control station, so-called sanctioning means which generate a stimulus at the animal, and means for operating the implementation of the sanctioning means, placed under the dependence of means for processing and analyzing the information supplied by said detecting means.

According to the invention, this device comprises the following arrangements taken alone or in combination.

According to a first aspect of the invention, the sanctioning means are means for misting a fluid, comprising an electric valve and a reservoir of the pressurized fluid, said operating means being means for activating the opening of the electric valve so as to release the fluid contained in the reservoir.

According to a second aspect of the invention, the implementing of the means for operating the sanctioning means is placed under the dependence of means for varying the activation of the electric valve in accordance with any one at least of the parameters comprising the duration between two successive activations, or, conversely, frequency of activation, of the electric valve, the duration of each of the activations of the electric valve, and the delivery of the electric valve at each of its constant-duration activations. However, a variation in the duration of activation and a variation in the delivery of the electric valve giving rise to inopportune consumption of the fluid, it is preferred to vary the activation of the electric valve only according to the frequency of activation, and to provide the device with means of user-adjustment of the duration of activation of the electric valve.

Nevertheless, it will be understood that should the regime of sanction by misting not be chosen by a designer, the modes of operation of the device of the invention in accordance with said second aspect would be applicable to any other means of sanction whose operating means allow such variations of implementation of the sanction.

According to a third aspect of the invention, the means for varying the sanction, therefore the activation of the electric valve, comprise means for measuring the distance separating the animal from the control station, and chronometric means for measuring the time of presence or non-presence of the animal in the zone. The device furthermore comprises means of user-selection of the implementation, so as to vary the activation of the electric valve, of one or other of said means for determining the variation of the distance or of said chronometric means.

Preferably, said selecting means are associated with means for adjusting the quantum of each of the parameters for varying the sanction, such as the activation of the electric valve in accordance with said first aspect of the invention.

According to a fourth aspect of the invention, said interactive means for detecting the position of the animal with respect to the control station comprise means for transmitting and receiving ultrasound signals respectively supported either by the animal, by way of a collar, for example, or by the control station, and means for processing and analyzing the ultrasound signal received comprising means for comparing between the ultrasound signal received and a target signal, so as to determine the presence or non-presence of the animal in the zone, and means for measuring the amplitude of the ultrasound signal received so as to determine the distance separating the transmitting means from the receiving means.

According to a fifth aspect of the invention, said means for analyzing the ultrasound signal received and said means for varying the activation of the electric valve implement a microprocessor, whose modes of operation are previously selected by the user from among a plurality of stored modes of operation, by means, for example, of a bank of switches constituting said selecting and adjusting means, by combination of selection between the various switches.

According to a sixth aspect of the invention, the means for processing the ultrasound signal received comprise means for amplifying and filtering the signal received, and for detecting the envelope of the signal so as to identify the signal received and recognize it as being the valid signal transmitted by the transmitting means of the device, and to transmit a so-called information signal to the comparing means and the means of measuring the amplitude of the signal received.

Preferably, the device furthermore comprises, interposed between the electrical energy source and the microprocessor, means referred to as means for putting the device onto standby, for placing the microprocessor into low-consumption regime in the absence of detection of a situation of misconduct of the animal relating to its presence or non-presence in the zone.

An operating process for a device just described, is characteristic in that it consists:

in recognizing the validity of the ultrasound signal received and in processing it to form a so-called information signal whose amplitude varies according to the intensity of the ultrasound signal received, in comparing the information signal with a reference signal, so as to detect the presence or the absence of the animal in the zone, and in parallel with this to input the information signal into the microprocessor, in, should the presence or the absence of the animal in the zone be detected, inputting a second signal, referred to as the implementing signal, into the microprocessor so as to activate the microprocessor normally in the standby position, the microprocessor then measuring the distance separating the animal from the control station on the basis of the amplitude of the information signal, and in using the microprocessor to vary the implementation of the operating means as a function of the selection previously made by the user by means of the bank of switches, either on the basis of the implementing signal input into the microprocessor by way of the chronometric means, or on the basis of the variation in the amplitude of the information signal.

It will be understood that according to another avenue of the invention, a process of the invention for prohibiting the crossing of a zone by an animal, is the process of the kind comprising the steps consisting in succession:

in detecting the presence or non-presence of the animal in a zone whose boundary is preadjusted by the user, by virtue of interactive means respectively carried on the animal and supported by the control station, so as to define a situation of misconduct or otherwise of the animal on the basis of the information exchanged between said interactive means, and in effecting, should a situation of misconduct be defined, a stimulus for the animal using means which may equally well be supported either by the animal or by the of the [sic] control station.

This process is characterized in that the stimulus is effected as soon as the situation of misconduct is defined, by spraying a fluid by means of an electric valve, the activation of which is placed under the dependence of the means for detecting the misconduct, and in repeating this stimulus with an acceleration of the frequency of spraying of the fluid, which frequency varies as a function of the alteration in the situation of misconduct in accordance with any one at least of the alteration factors comprising a variation of the distance separating the animal from the control station, and a persistence of the situation of misconduct.

Preferably, this process comprises the prior step consisting in selecting the regime of operation of the device desired by the user from among a plurality of stored modes of operation.

BRIEF DESCRIPTION OF THE DRAWINGS

The present invention will be better understood and details relating thereto will become apparent in the description which will be provided of preferred embodiments thereof, in conjunction with the figures of the appended plates, in which:

FIGS. 5 to 11 are illustrations of various regimes of operation of a device of the invention, each of the illustrations comprising two graphs, the upper one illustrating the movements of the animal with respect to a control station and the lower one illustrating the regimes of activation of an electric valve for the spraying of a fluid.

FIG. 15 is a diagram detailing the organization of the means of the devices illustrated in FIGS. 12 to 14.

DESCRIPTION OF THE INVENTION AND PREFERRED EMBODIMENT

Figure 1B:
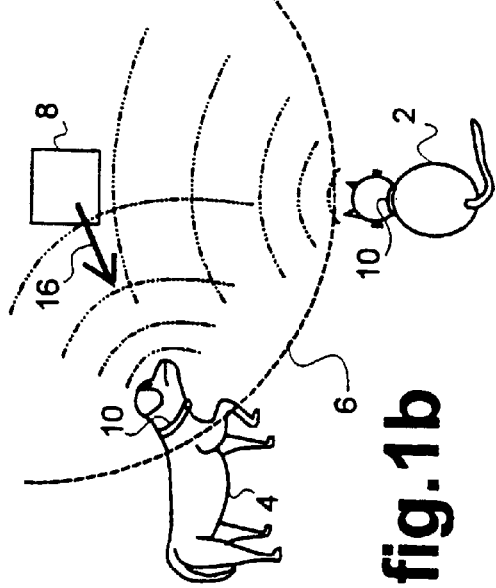
Figure 1A:
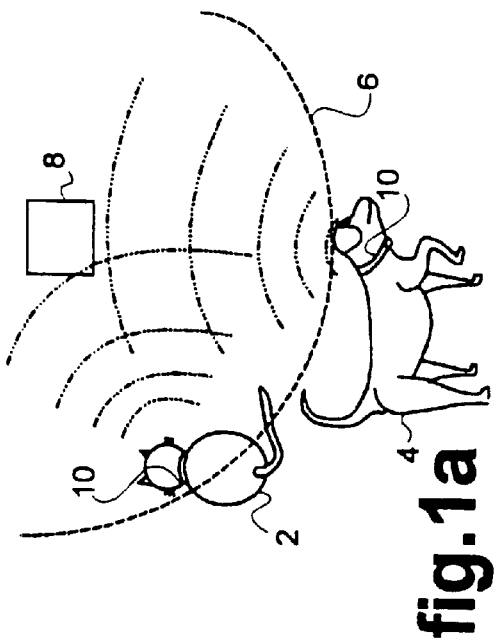

In the figures, a device for prohibiting the crossing of a zone boundary between an animal 2, 4 and a control station aims to distance an animal 2, 4 from a zone to be protected, such as 6 in the example in FIG. 1. In this same example, the device associates a collar 10 worn by the animal 2, 4 and equipped with means 12 for transmitting an ultrasound signal, with a control station 8, equipped with means 14 for receiving said ultrasound signal and with means for spraying a fluid, comprising an electric valve 16 whose activation is placed under the dependence of operating means which are themselves placed under the dependence of means for processing and analyzing the ultrasound signal received.

Said means for processing and analyzing the ultrasound signal received comprise means 18 for detecting the presence or otherwise of the animal in the zone, means 20 for measuring the distance separating the animal 2, 4 from the control station 8, and chronometric means 22 for measuring the time for which the animal 2, 4 is present in the zone.

The device furthermore comprises means 24 for varying the duration of activation of the electric valve 16, and means 26 for varying the frequency of activation of the electric valve 16.

Referring to FIGS. 5 to 11, the device of the invention is such that the activation of the electric valve 16 varies in duration and/or in frequency in the course of a situation in which account is taken of the factors of variation of the position of the animal with respect to the control station, either because the former is approaching or moving away from the latter, or because the former is stationary in the zone to be prohibited.

For example in FIGS. 5 to 7, and referring to the upper graph A of the figures, the animal approaches the control station until it reaches the zone boundary (span a) onwards of which the electric valve 16 is activated, then the animal stops (span b) and approaches again (span c). Referring to the lower graph B of the figures, the electric valve is activated as soon as the animal crosses the zone boundary and remains activated at constant frequency so long as the animal remains stationary (span b); when it approaches closer to the control station (span c), the activation of the electric valve varies, increasing either in duration (FIG. 5), or in frequency (FIG. 6), or in both duration and frequency (FIG. 7).

Again, for example in FIGS. 9 to 11, and referring to the upper graph A of the figures, the animal, still present in the zone (span d, e, f), approaches the control station in a first stage (span d), then remains stationary (span e), then moves away in a third stage (span f). Referring to the lower graphs B of the figures, the activation of the electric valve varies so long as the animal, stationary in a posture of observation, is present in the zone (span e), said variation being implemented either in terms of frequency (FIG. 9), or in terms of amplitude (FIG. 10), or in terms of amplitude and frequency (FIG. 11).

In a last example illustrated in FIG. 8, the activation of the electric valve varies, when the animal is approaching (spans h and i), in terms of amplitude and frequency for example, is halted when the animal is stationary (span j), or again when the animal moves away (span k), after a phase of approaching, even if it is still present in the zone.

Figure 3:
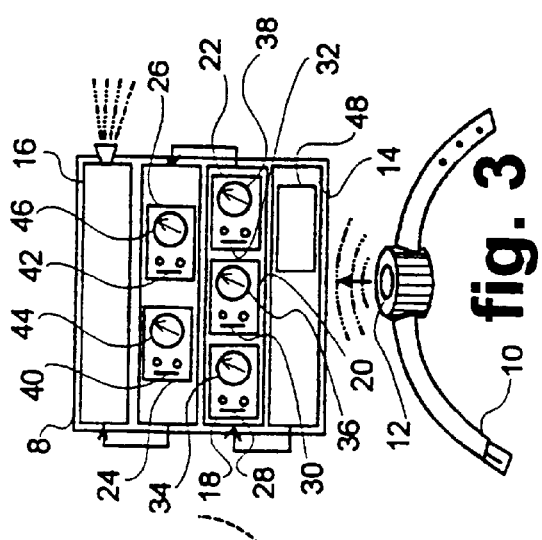
FIGS. 3 and 4 are diagrammatic representations of various embodiments of a device of the invention, for the applications of the previous figures respectively.
Figure 4:
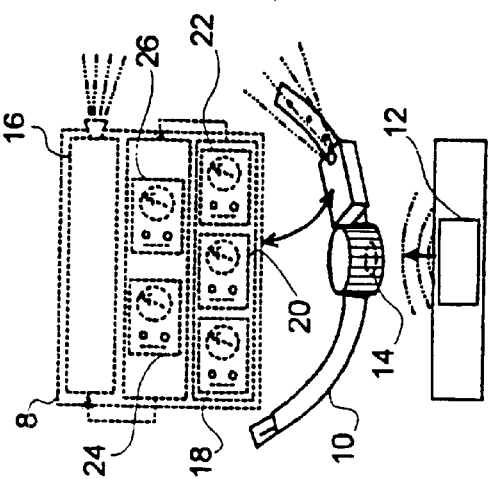

In FIGS. 3 and 4, to offer greater flexibility of use of the device of the invention, and to enable the user to tailor the activation of the electric valve as a function of his/her knowledge of the postures of the animal and of its acclimatization to the modes of operation of the device, the latter has means 28, 30, 32, 40, 42 for selecting the implementation firstly of the means 18 for detecting the animal in the zone, means 20 for measuring the distance between the animal and the control station, and chronometric means 22, and secondly means 24 for varying the duration of activation of the electric valve 16 and means 26 for varying the frequency of activation of the electric valve 16. The user has moreover means 34, 36, 38, 44, 46 for respectively adjusting said means 18, 20, 22, 24, 26 for their initialization and for thus determining their threshold of implementation.

It will be noted that according to a preferred embodiment, display means, such as light-emitting diodes (represented in the diagram of FIG. 13), are respectively associated with the various selecting and adjusting means envisioned above, so as to make the device of the invention more ergonomic, and especially so as to aid the user's endeavors aimed at adjusting the various means which he wishes to implement.

According to the exemplary embodiment of the device of the invention as represented in FIGS. 1 and 3, and more particularly as applied to the prohibiting of the approaching of the animal toward the control station 8, the transmitter means 12 are supported by the collar 10 whilst the receiver means 14, the means for analyzing and processing the signal received and the means 16 for spraying fluid are supported by the control station 8.

Figure 2B:
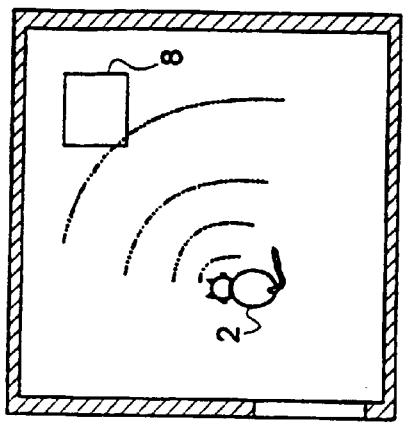
FIGS. 1 and 2 are illustrations of respective examples of the application of a device of the invention according to various embodiments, each of the illustrations comprising two diagrams a and b representing an exemplary situation with two different steps.
Figure 2A:
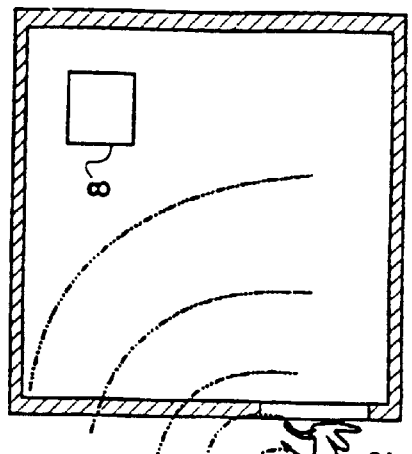

According to the exemplary embodiment of the device of the invention, represented in FIGS. 2 and 4, and more particularly as applied to the prohibiting of the moving away of the animal, the transmitter means 12 are supported by the control station 8, whilst the receiver means 14, the means of analyzing and processing the signal received and the means 16 of spraying fluid are supported by the collar 10. According to this exemplary embodiment, the user can select the chronometric means 22 so as to vary the sanction according to the time of absence of reception of the ultrasound signal, and hence the time of absence of the animal outside the zone, or else to select the means for determining the variation in distance so as to apply the sanction as soon as the animal approaches too close to the zone boundary not to be crossed.

According to a preferred embodiment of the invention, the means 12 and 14 for detecting the presence or non-presence of the animal in the zone comprise coding means 48 (FIG. 3) cooperating for reliable recognition of the signal, so as in particular to avoid inopportune interference in the information exchanged and for recognition of a signal transmitted by the transmitter means 12 from among a plurality of transmitter means 12 supported by a respective collar.

For example, in FIGS. 1 and 3 the coding means 48 make it possible to identify the dog 4 and the cat 2, and automatically to adapt the activation of the electric valve 16 as a function of the animal 2, 4 which is approaching: in FIG. 1, the activation of the electric valve 16 cuts in for a specified position of the dog with respect to the control station 8, while it is not implemented for a same position of the cat 4. It will be understood that in this case there must be an equivalent number of analyzing means 18, 20, 22 and of operating means 24, 26 as number of harnesses 10.

It will be noted that FIGS. 12 to 15 illustrate embodiments of the invention within a digital, or logic regime of operation, implementing a microprocessor; nevertheless, it will be understood that these embodiments are given merely by way of example and that in an equivalent manner the electronic means implemented by the invention could be means which determine an analog regime of operation, comprising in particular potentiometers for adjusting the various thresholds of the analyzing and operating means.

Figure 12:
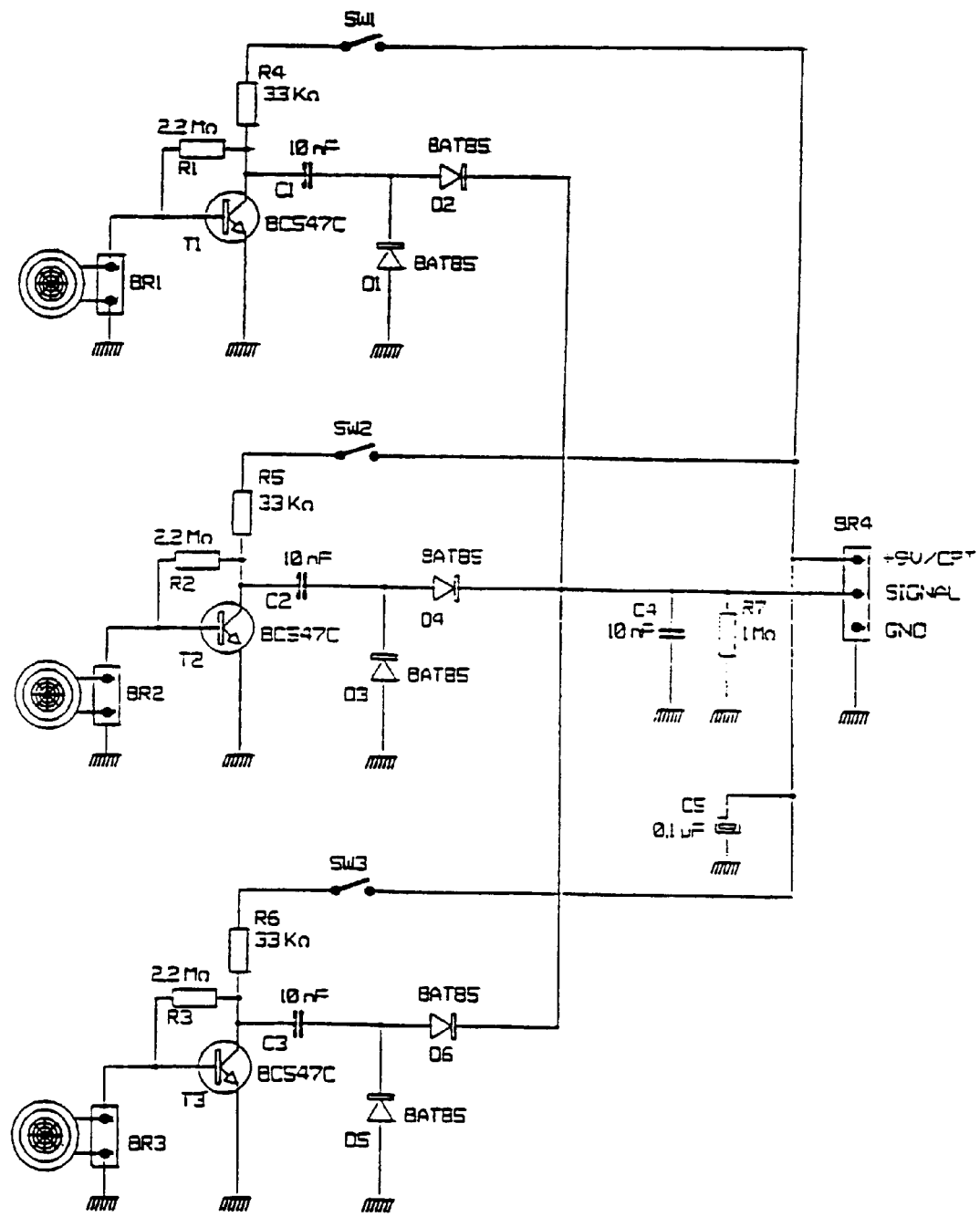
FIGS. 12 and 13 are electronic diagrams understandable to the person skilled in the art, which illustrate an elementary example of the construction of the analyzing and operating means of a device of the invention, in the case where they are supported by the control station.
Figure 13:
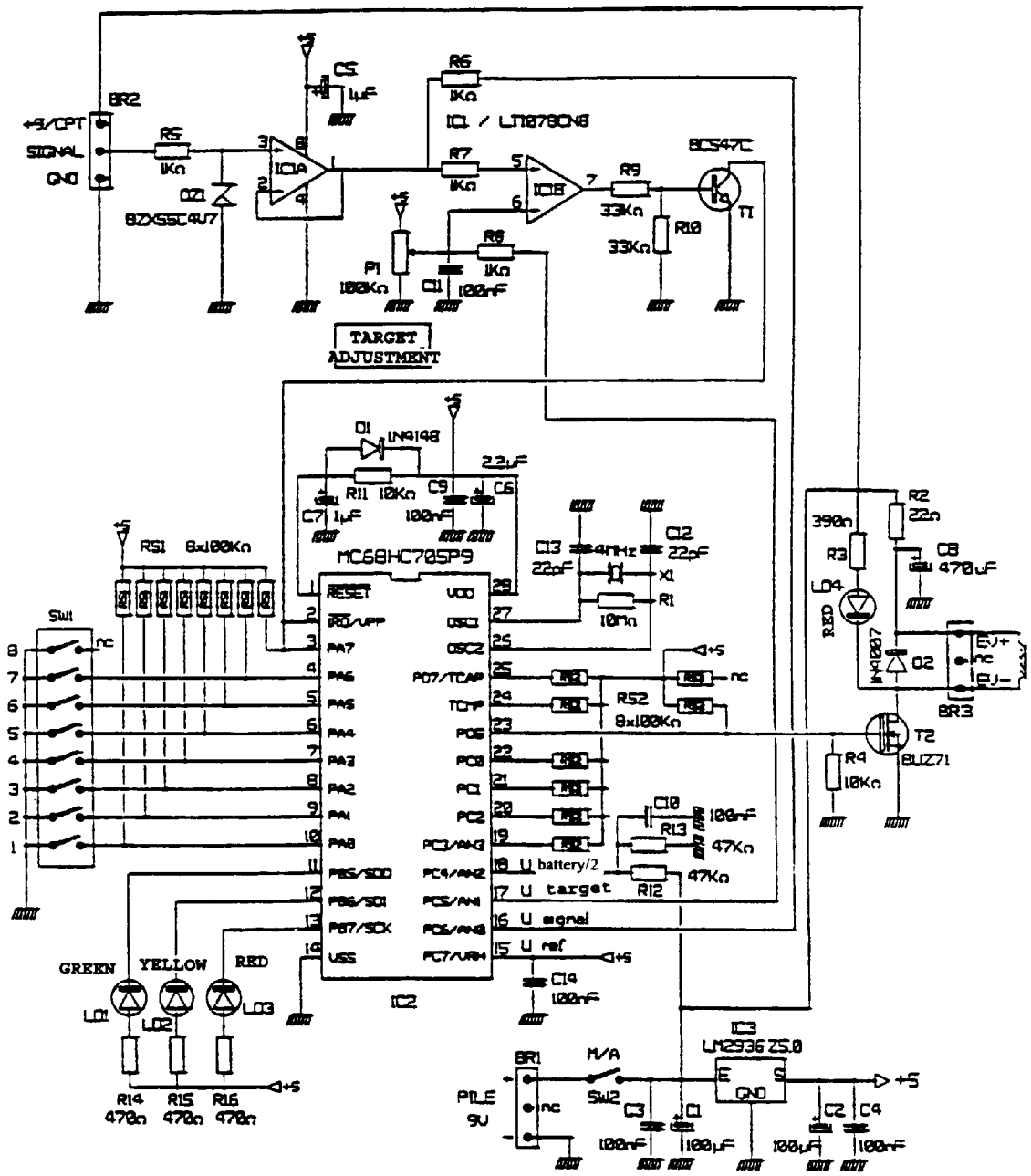
Figure 14:
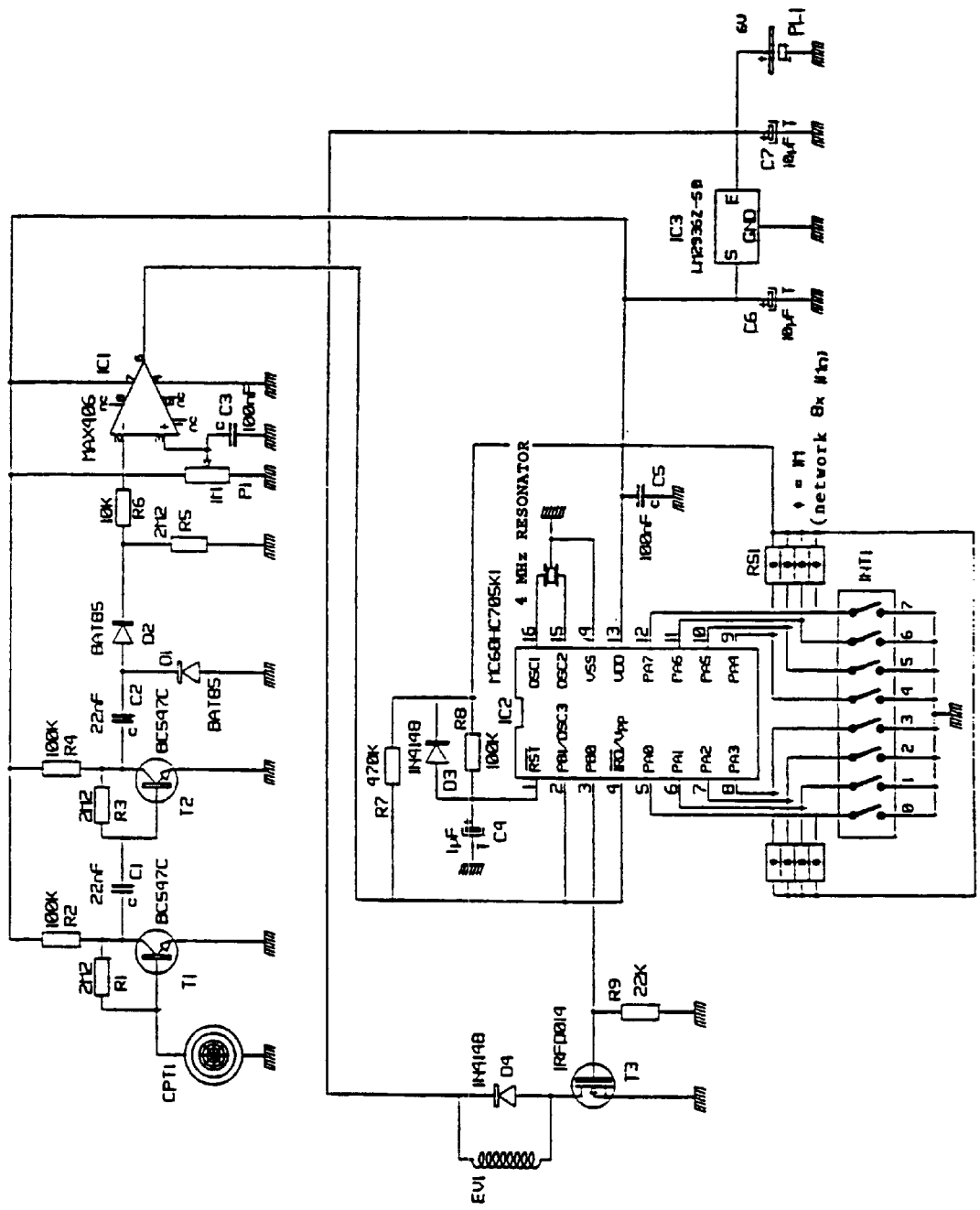
FIG. 14 is an electronic diagram understandable to the person skilled in the art, which illustrates an elementary example of the construction of the analyzing and operating means of a device of the invention, in the case where they are carried on the animal.

Referring more particularly to the diagram of FIG. 15, in conjunction with those of FIGS. 12 to 14, which illustrate simple exemplary embodiments of a device of the invention, three ultrasonic sensors 14 are arranged in accordance with 120°0 concurrent orientations so as to offer omnidirectional reception of the ultrasound signals transmitted. For each sensor 14, means 50 for processing the signal received amplify and filter the latter, which then undergoes envelope detection for identification thereof. The three signals thus processed are grouped together on a single output, their amplitude corresponding to the intensity of the ultrasound signal received, and hence to the distance separating the transmitter means 12 and the sensors 14.

The processed signal is applied to the microcontroller 52 and to a comparator 54 of the processed signal with respect to a target signal corresponding to the zone boundary. It will be noted that this target signal can be adjusted by means of a potentiometer 56 for example, so as to enable the user to define a zone boundary lying for example between 0.5 m and 6 m approximately. When the signal applied to the comparator 54 oversteps the threshold of the target signal, the output of the comparator 54 triggers the operation of the microcontroller 52, by way of means 68 for putting the device onto standby. It will thus be noted that when there is no signal at the output of the comparator 54, the microcontroller 52 is placed in a low-consumption regime, and that it is put onto standby, following a period of activity, after the signal is absent for more than 500 ms for example.

The modes of operation of the microcontroller 52 are multiple and may be selected by the user from a bank of switches 58.

According to a first example of operation selected, the microcontroller 52 measures the amplitude of the signal which it receives, and, by way of the operating means 66, operates the activation of the electric valve 16 with an activation frequency which varies as a function of this amplitude, and hence as a function of the distance separating the animal from the control station 8. According to a second example, as long as the signal is present at the input of the microcontroller 52, the electric valve is activated with a variation in activation frequency.

It will be understood that the variation in the frequency of the activations of the electric valve is effected through a reduction in the fraction of time separating two successive activations of the electric valve, said fraction of time being chosen by the user by virtue of said means for selecting a regime of operation of the device from among a plurality of stored regimes of operation.

By virtue of the bank of switches 58, the user can adjust the duration of each of the activations of the electric valve 16, between 40 ms and 320 ms for example, the frequency, or the variation in frequency, between two activations of the electric valve 16, between 0.5 s and 8 s for example, and the maximum duration of action of the device after detecting a situation of misconduct, for example up to 30 s.

It will be noted that the switches of the bank 58 can advantageously be replaced with transponders which can be actuated via a remote control with buttons for selecting programs from among a plurality of stored programs, corresponding to a respective regime of operation of the device.

The device comprises a battery 60 which directly powers an energy saving circuit 62, the role of which is to optimize the electrical consumption with each activation of the electric valve 16. The other circuits of the device are powered via a regulator 64 so as not to be subjected to the voltage variations caused by the activation of the electric valve.

What is claimed is:

1. Device for prohibiting the crossing of a zone boundary by an animal (2, 4), the device comprising:
   a low-voltage electrical energy source (16),
   means (18, 12, 14) for detecting the position of the animal (2, 4) with respect to a zone boundary, comprising interactive means (12, 14) respectively carried by the animal (2, 4) and supported by a control station (8),
   sanctioning means (16) which generate a stimulus at the animal (2, 4), and
   means (66) for being actuated by the sanctioning means and for activating the opening of the electric valve (16) so as to release the fluid contained in the reservoir, wherein the means (66) for being actuated by the sanctioning means and for activating the opening of the electric valve (16) is placed under the dependence of means (18, 20, 22, 24, 26, 50, 52, 54) for processing and analyzing the information supplied by said detecting means (12, 14), and wherein
   the sanctioning means (16) are means for misting a fluid, comprising an electric valve and a reservoir of a pressurized fluid.

2. Device according to claim 1,
   wherein the means (18, 20, 22, 24, 26, 50, 52, 54) for processing is a means (24, 26, 52) for varying the activation of the electric valve (16), wherein the means (66) for being actuated by the sanctioning means (16) and for activating the opening of the electric valve (16) is depending on the means (24, 26, 52) for varying the activation of the electric valve (16) depending on any one at least of the parameters comprising the duration between two successive activations, or, conversely, frequency of activation, of the electric valve (16), the duration of each of the activations of the electric valve (16), and the delivery of the electric valve (16) at each of its constant-duration activations.

3. Device according to claim 2,
   wherein the means for varying the activation of the electric valve (16) comprise means (12,14, 20, 52) for measuring the distance separating the animal (2, 4) from the control station (8), and chronometric means (22) for measuring the time of presence or non-presence of the animal (2, 4) in the zone, and means (58, 28, 30, 32, 40, 42) of user-selection of the implementation, so as to vary the activation of the electrovalve (16), of one or other of the means (12, 14, 20, 52) for measuring the distance or chronometric means (22).

4. Device according to claim 3,
   wherein said selecting means (28, 30, 32, 40, 42) are associated with means (34, 36, 38, 44, 46) for adjusting the quantum of each of the parameters for varying the activation of the electric valve.

5. Device according to claim 3,
   wherein interactive means for detecting the position of the animal with respect to the control station comprise means for transmitting (12) and receiving (14) ultrasound signals respectively supported either by the animal (2, 4) or by the control station (8), and means for processing and analyzing the ultrasound signal received comprising means (54) for comparing between the ultrasound signal received and a target signal, so as to determine the presence or non-presence of the animal (2, 4) in the zone, and means (52) for measuring the amplitude of the ultrasound signal received so as to determine the distance separating the transmitting means (12) from the receiving means (14).

6. Device according to claims 4 and 5,
   wherein said means for analyzing the ultrasound signal received and said means for varying the activation of the electric valve implement a microprocessor (52), whose modes of operation are previously selected by the user from among a plurality of stored modes of operation, by means of a bank of switches (58) constituting said selecting and adjusting means, by combination of selection between the various switches.

7. Device according to claim 5,
   wherein the means for processing the ultrasound signal received comprise means (50) for amplifying and filtering the signal received, and for detecting the envelope of the signal so as to identify the signal received and recognize it as being the valid signal transmitted by the transmitting means (12) of the device, and to transmit a so-called information signal to the comparing means (54) and the means (52) for measuring the amplitude of the signal received.

8. Device according to claim 6,
   wherein the device furthermore comprises, interposed between the electrical energy source (60) and the microprocessor (52), means (68) referred to as means for putting the device onto standby, for placing the microprocessor (52) into low-consumption regime in the absence of detection of a situation of misconduct of the animal (2, 4) relating to its presence or non-presence in the zone.

9. Operating process for a device according to claims 7 and 8, wherein the operating process consists:

in recognizing the validity of the ultrasound signal received and in processing it to form a so-called information signal whose amplitude varies according to the intensity of the ultrasound signal received, in comparing the information signal with a reference signal, so as to detect the presence or the absence of the animal (2, 4) in the zone, and in parallel with this to input the information signal into the microprocessor (52), in, should the presence or the absence of the animal (2, 4) in the zone be detected, inputting a second signal, referred to as the implementing signal, into the microprocessor (52) so as to activate the microprocessor (52) normally in a standby position, the microprocessor (52) then measuring the distance separating the animal (2,4) from the control station (8) on the basis of the amplitude of the information signal, and in using the microprocessor (52) to vary the implementation of the operating means (66) as a function of the selection previously made by the user by means of the bank of switches (58), either on the basis of the implementing signal input into the microprocessor (52) by way of the chronometric means (22), or on the basis of the variation in the amplitude of the information signal.

10. Process for prohibiting a crossing of a zone by an animal implementing a device according to claim 2, the process being of the kind comprising the steps consisting in succession:

in detecting the presence or non-presence of the animal (2, 4) in a zone (6) whose boundary is preadjusted by the user, by virtue of interactive means (12, 14) respectively carried on the animal (10, 2, 4) and supported by the control station (8), so as to define a situation of misconduct or otherwise of the animal (2, 4) on the basis of the information exchanged between said interactive means (12, 14), and in effecting, should a situation of misconduct be defined, a stimulus for the animal (2, 4) using means (16) which may equally well be supported either by the animal (2, 4) or by the control station (8), characterized:

in that the stimulus is effected as soon as the situation of misconduct is defined, by spraying a fluid by means of an electric valve (16), the activation of which is placed under the dependence of the means (12, 14) for detecting the misconduct, and in repeating this stimulus with an acceleration of the frequency of spraying of the fluid, which frequency varies as a function of the alteration in the situation of misconduct in accordance with any one at least of the alteration factors comprising a variation of the distance separating the animal (2, 4) from the control station (8), and a persistence of the situation of misconduct.

11. Process according to claim 9, wherein the process comprises the prior step consisting in selecting the regime of operation of the device desired by the user from among a plurality of stored modes of operation.

* * * * *